United States Patent
Hanaoka et al.

(10) Patent No.: US 6,378,641 B1
(45) Date of Patent: Apr. 30, 2002

(54) VEHICLE EQUIPPED WITH TURNING MECHANISM

(75) Inventors: Tadashi Hanaoka; Masaru Katayama; Yasuto Shigematsu; Yoshito Hamasaki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/621,355

(22) Filed: Jul. 20, 2000

(30) Foreign Application Priority Data

Jul. 23, 2000 (JP) ............................................ 11-209225

(51) Int. Cl.[7] ................................................ B62D 9/00
(52) U.S. Cl. ...................... 180/204; 180/411; 180/6.44
(58) Field of Search ................................. 180/199, 202, 180/204, 411, 6.2, 6.24, 6.28, 6.44; 280/761

(56) References Cited

U.S. PATENT DOCUMENTS

| | | | |
|---|---|---|---|
| 4,516,653 A | * 5/1985 | Walker | 180/423 |
| 5,722,504 A | * 3/1998 | Gaetani | 180/411 |
| 5,738,376 A | * 4/1998 | Marom | 280/761 |
| 6,125,963 A | * 10/2000 | Staiger | 180/411 |

\* cited by examiner

*Primary Examiner*—Kevin Hurley
(74) *Attorney, Agent, or Firm*—Armstrong, Westerman & Hattori, LLP (57) ABSTRACT

A four-wheel vehicle equipped with a space saving, relatively simple turning mechanism capable of turning a vehicle body with a sufficiently reduced turning radius. One of front and rear pairs of left and right wheels, to which a running torque produced by a driving force is not transmitted, are arranged for rotation concerning respective axes perpendicular to the ground. For turning the vehicle body, the one pair of left and right wheels are fixed at respective angular positions along tangential directions of an arc which passes the axes perpendicular to the ground of the one pair of left and right wheels and has the center near the center point of a rotating axle for running the vehicle of the other pair of left and right wheels. At these angular positions, rotating torques in different rotating directions from each other are applied to the other pair of left and right wheels, respectively, to turn the vehicle body on a neighborhood of the center point of the rotating axle for running the vehicle of the other pair of left and right wheels.

5 Claims, 12 Drawing Sheets

VEHICLE EQUIPPED WITH TURNING MECHANISM

BACKGROUND OF THE INVENTION

1. Field of the Invention

The present invention relates to a vehicle which can turn with a smaller turning radius.

2. Description of the Related Background Art

For four-wheel vehicles, a parameter called the "turning radius" is known for indicating the performance of each four-wheel vehicle. A vehicle having a smaller turning radius can make a smaller turn at a corner during a turning operation such as U-turn.

Vehicles employing four-wheel steering (4WS) have been known as prior art four-wheel vehicles which can improve the turning radius. The 4WS refers to a system which controls the steering angle (rudder angle) of not only front wheels but also rear wheels in association with a manipulation through a steering wheel. The 4WS system can reduce the turning radius due to the controllable steering angle provided to the rear wheels.

A fifth wheel system is also known as an improvement in the turning radius. The fifth wheel system additionally has a fifth wheel stored below the floor, in addition to four wheels, such that the fifth wheel is slightly protruded relative to the other wheels during a turn to lift up the vehicle body, and the fifth wheel is driven to have the vehicle make a turn.

However, the 4WS, while it is effective in reducing the turning radius, suffers from limitations to the reduction in the turning radius since the steering angle is limited in order to suppress an inherent shake-out phenomenon to a practically ignorable extent. The fifth wheel system in turn is expected to provide significant effects, but implies problems that the vehicle becomes unstable due to a three-wheel state during a turning operation, the mechanism involved in the system tends to be complicated, and a large space is required to accommodate the mechanism including the fifth wheel.

SUMMARY OF THE INVENTION

It is therefore an object of the present invention to provide a vehicle which is capable of turning with a relatively simple turning mechanism, which saves a required space, to sufficiently reduce the turning radius.

A four-wheel vehicle equipped with turning mechanism according to the present invention comprises a rotatably supporting device for supporting one of front and rear pairs of left and right wheels, to which running torque produced by a driving force is not transmitted, for rotation concerning respective axes perpendicular to the ground; a rotating position fixing device for fixing the one pair of left and right wheels at respective angular positions along tangential directions of an arc passing the axes perpendicular to the ground of the one pair of left and right wheels, and having the center located near a center point of a rotating axle for running the vehicle of the other of the front and rear pairs of left and right wheels; and a turn driving device for applying rotating torques in the rotating directions different from each other to the other pair of left and right wheels at the angular positions fixed by the rotating position fixing device to turn a vehicle body in a neighborhood of, that is, at or adjacent to the center point of the rotating axle for running the vehicle of the other pair of left and right wheels.

According to the four-wheel vehicle of the present invention described above, since one of front and rear pairs of left and right wheels, to which a running torque produced by the driving force is not transmitted, are supported for rotation concerning the respective axes perpendicular to the ground, and the one pair of left and right wheels are fixed during a vehicle body turning operation at the respective angular positions along the tangential directions of the arc passing the axes perpendicular to the ground of the one pair of left and right wheels, with the center of the arc located near the center point of the rotating axle for running the vehicle of the other pair of left and right wheels, it is possible to provide a relatively simple and small turning mechanism. In addition, since the radius of the arc passing the axes of the one pair of left and right wheels perpendicular to the ground and having the center near the center point of the rotating axle of the other pair of left and right wheels is the turning radius when the vehicle is turned, the turning radius is extremely small.

Further, since the other pair of left and right wheels are applied with rotating torques in rotating directions different from each other at the fixed angular positions of the one pair of left and right wheels, the vehicle body can be readily turned.

Also, since the turn driving device has a motor which drives either of two side gears for rotation while fixing a case for rotatably supporting the two side gears within a differential, it is possible to reliably turn the vehicle body in a neighborhood, that is, at or adjacent to the center point of the rotating axle of the other pair of left and right wheels.

DETAILED DESCRIPTION OF THE PREFERRED EMBODIMENT

One embodiment of the present invention will hereinafter be described in detail with reference to the accompanying drawings.

Figure 1:
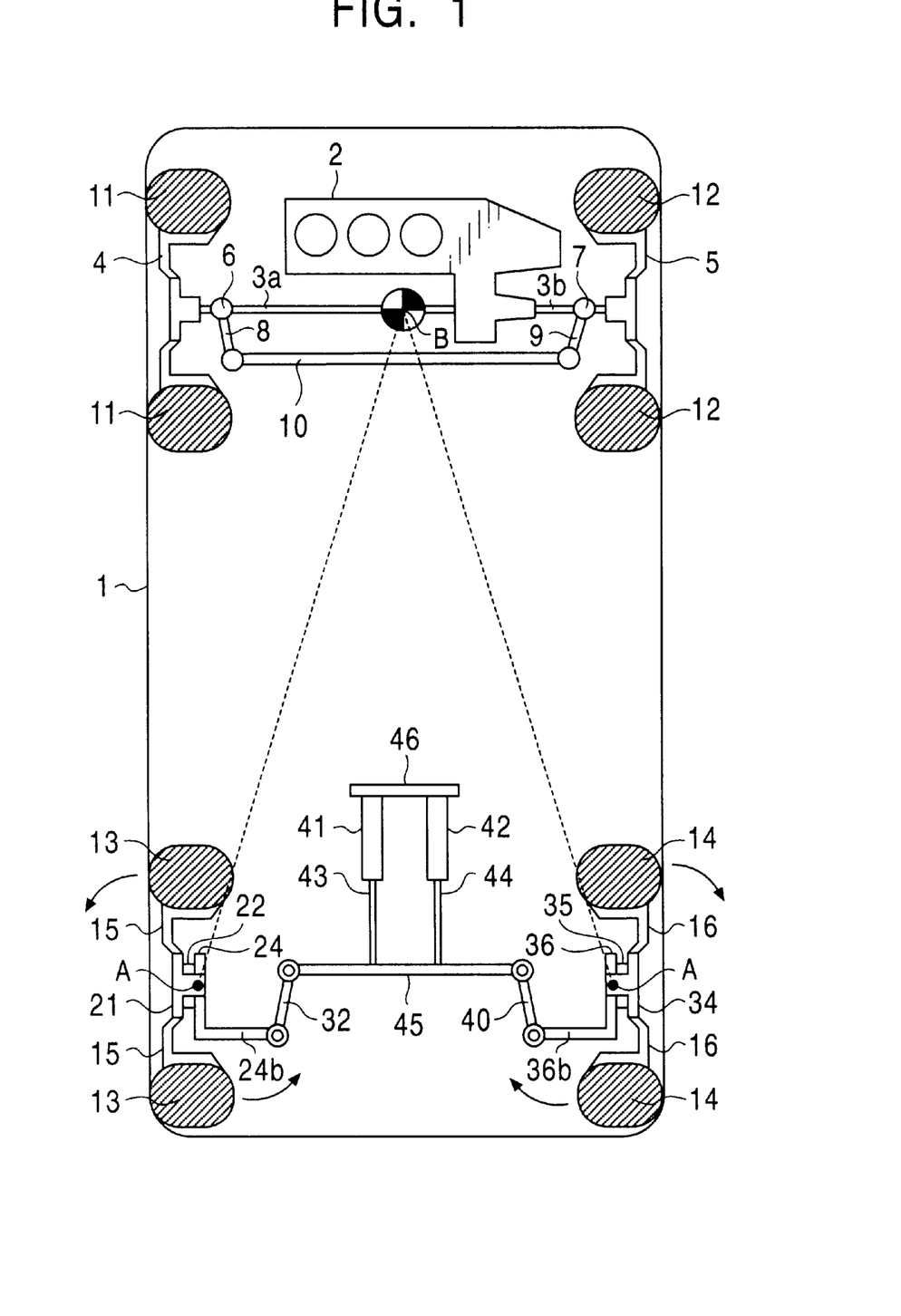
FIG. 1 is a diagram generally illustrating the structure of a four-wheel vehicle as an embodiment of the present invention.

FIG. 1 illustrates the general structure of a four-wheel vehicle equipped with a turning mechanism according to the present invention, viewed from a horizontal plane including the cross-sections of four front and rear tires 11–14 of the vehicle. The illustrated vehicle is a front wheel driven (FF) vehicle which has an engine body 2 positioned in a front portion of a vehicle body 1 to drive a left front wheel 4 through a driving axle 3a and a right front wheel 5 through a driving axle 3b to rotate. Front wheels 4, 5 inside the left and right front tires 11, 12 are coupled to a steering mechanism composed of knuckles 6, 7, knuckle arms 8, 9, and a tie rod 10.

Figure 2:
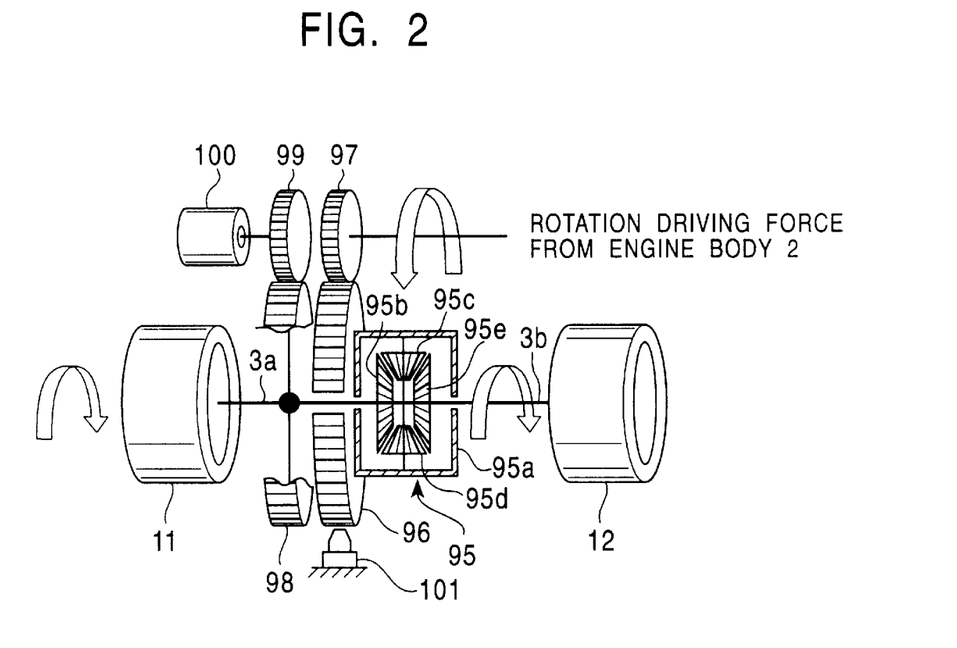
FIG. 2 is a diagram generally illustrating a front wheel driving mechanism.

As illustrated in FIG. 2, the driving axles 3a, 3b are provided with a differential 95. A ring gear 96 fixed to the case 95a of the differential 95 meshes with a driving gear 97. The driving gear 97 is driven by an engine body 2 to rotate. A stopper 101 is engageable with teeth of the ring gear 96 by a mechanism, not shown, such that the rotation of the ring gear 96 is forcedly stopped when the stopper 101 engages with the ring gear 96. The stopper 101 is driven by a stopper driving unit 102, illustrated in FIG. 6 later described, to engage with the ring gear 96.

A gear 98 is also attached to the driving axle 3a so as to rotate with the driving axle 3a. The gear 98 meshes with the driving gear 99. The driving gear 99 is driven by a motor 100 to rotate. The motor 100, which serves as a driving source for turning the vehicle body 1, is normally rotated for turning the vehicle body 1 counterclockwise, and is reversely rotated for turning the vehicle body 1 clockwise.

Left and right rear wheels 15, 16 inside left and right rear tires 13, 14 in turn are rotatably arranged. A flange-shaped hub 21 is arranged at the center of the rear wheel 15, and the hub 21 is rotatably supported by a bearing 22, as specifically illustrated in FIGS. 3 and 4.

Figure 3:
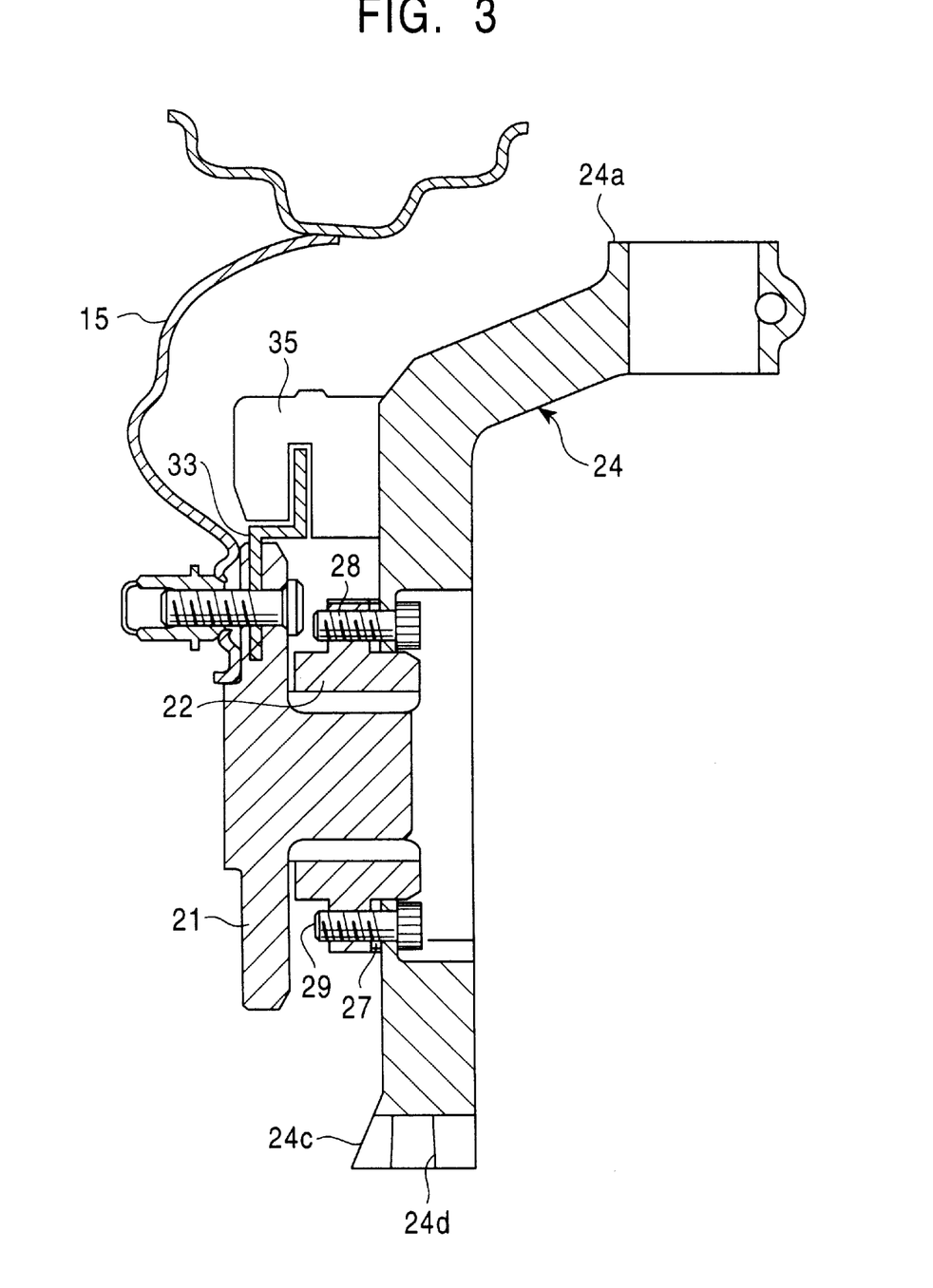
FIG. 3 is a cross-sectional view illustrating specifically a feature associated with a rear wheel.

As can be seen in FIG. 3, a knuckle 24 has a lower portion cut away from the ring shape thereof, which serves as a support 24c rotatably coupled to a screw 30a of a trailing arm 30. More specifically, the screw 30a of the trailing arm 30 is inserted into a throughhole 24d of the support 24c from below, and the screw 30a is screwed into a nut 30b. This pivotable coupling of the trailing arm 30 to the knuckle 24 enables the rear wheel 15 to pivotally move on an axis perpendicular to the ground.

Also, a bearing 22 is secured to the knuckle 24 through a washer 27 with bolts 28, 29. The knuckle 24 has two knuckle arms 24a, 24b extending from the outer periphery thereof, with a shock absorber 31 coupled to the leading end of the knuckle arm 24a. The knuckle arm 24b, which is formed in L-shape, is coupled to one end of a connecting arm 32 which forms part of a turning mechanism. The connecting arm 32 is arranged for two-dimensional pivotal movements on the coupling point.

As particularly illustrated in FIG. 3, a brake disk 33 is also fixed to the hub 21, and a brake caliper 35 is fixed to the knuckle 24, such that the brake disk 33 comes in contact with the brake caliper 35 to generate a braking force in response to the driver stepping on a brake pedal, not shown.

Figure 4:
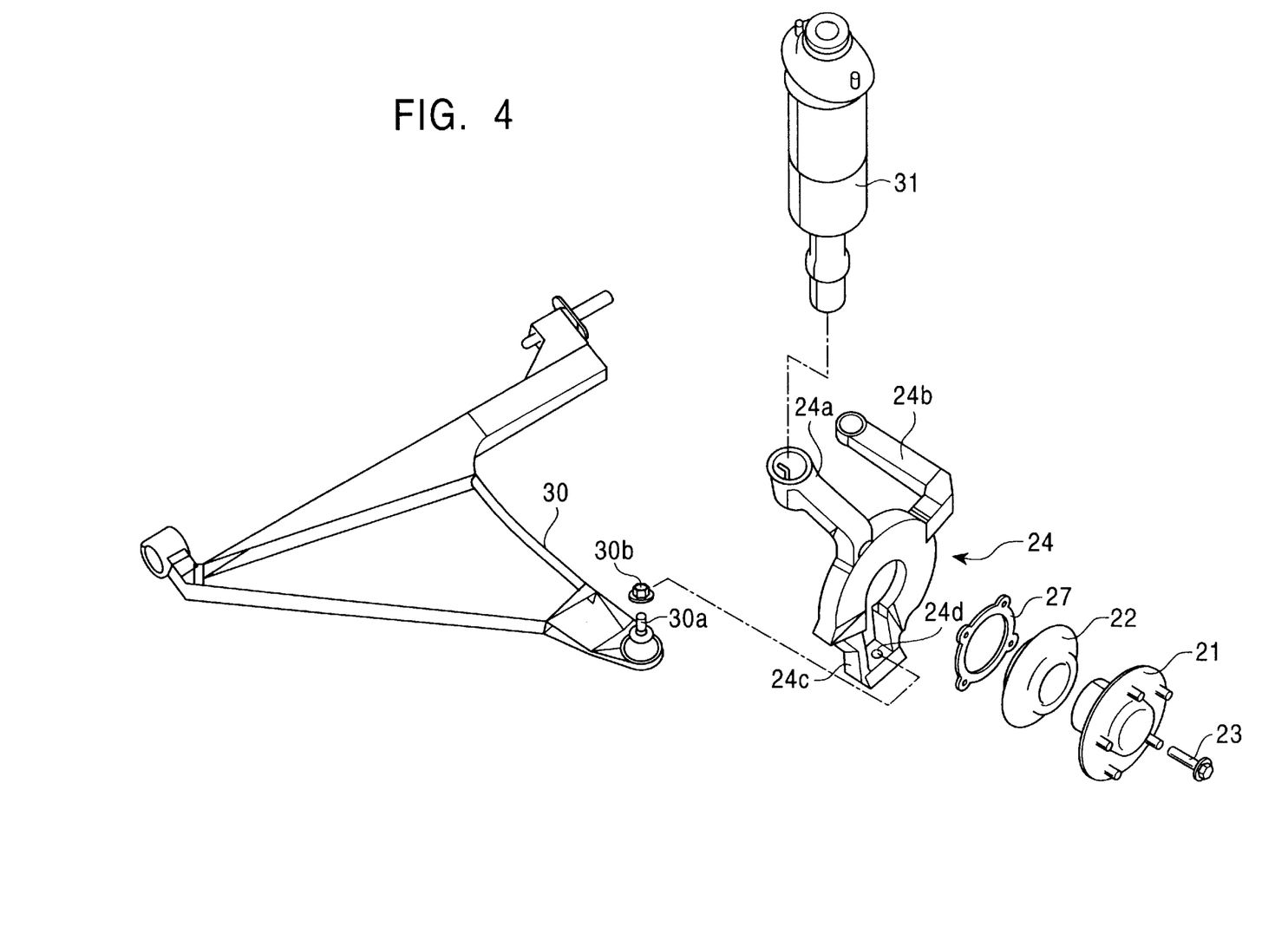
FIG. 4 is an assembling diagram illustrating the feature associated with the rear wheel of FIG. 3.

It will be understood that while FIGS. 3 and 4 illustrate only the feature associated with the left rear wheel, a feature associated with the right rear wheel 16 is formed symmetric to the feature associated with the left rear wheel 15.

Figure 5:
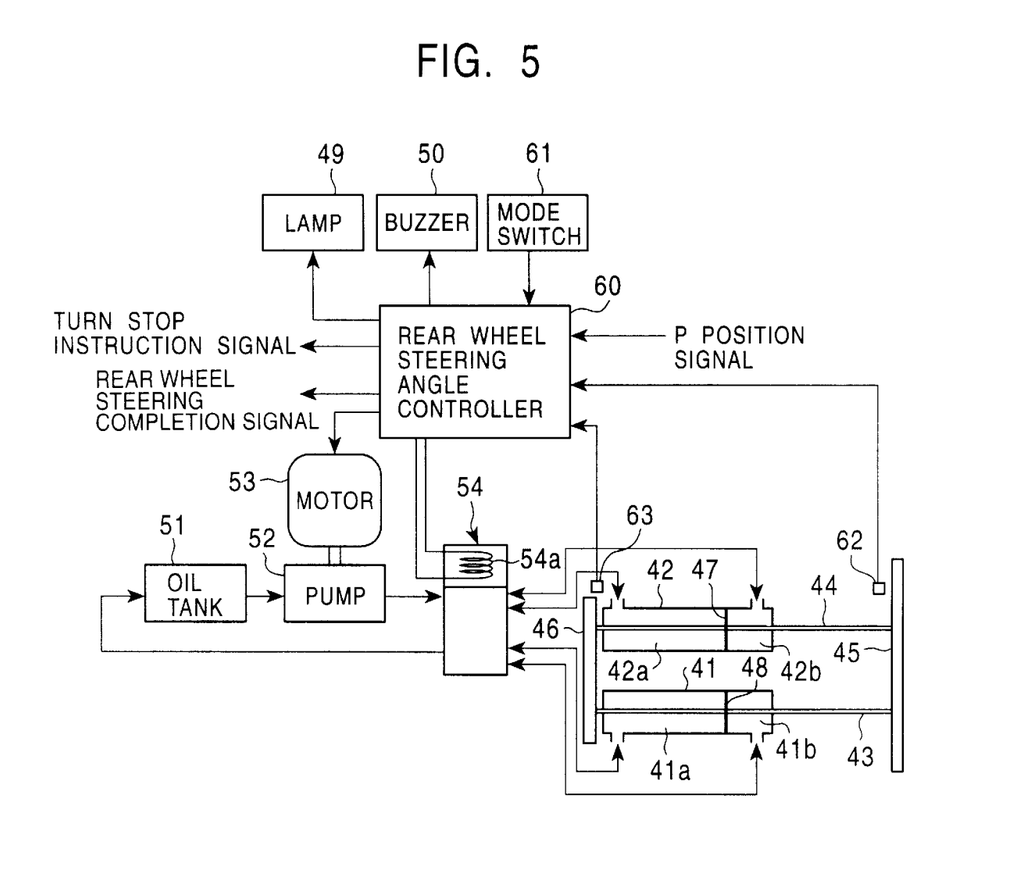
FIG. 5 is a block diagram illustrating a rear wheel steering system including a hydraulic circuit and an electrical circuit.

As illustrated in FIG. 1, the turning mechanism comprises a right connecting arm 40, two hydraulic cylinders 41, 42, two rods 43, 44, and two rims 45, 46 in addition to the above-mentioned left connecting arm 32. The hydraulic cylinders 41, 42 are fixed to the vehicle body 1 in parallel with each other such that pistons 47, 48 arranged therein are slidable in the longitudinal direction of the vehicle body 1, as illustrated in FIG. 5 later described. The rods 43, 44 extend through the corresponding hydraulic cylinders 41, 42. The rims 45, 46 are bar-shaped members which serve as stoppers. The rim 45 has one end coupled to the other end of the connecting arm 32 for two-dimensional pivotal movements and the other end coupled to the other end of the connecting arm 40 for two-dimensional pivotal movements. The rims 45, 46 are arranged in parallel with each other, with the rods 43, 44 interposed therebetween. Each of the rods 43, 44 has one end secured to the rim 45, and the other end secured to the rim 46. The rods 43, 44 are coupled to and extend through the pistons 47, 48 in the hydraulic cylinders 41, 42, respectively, so that the rods 43, 44 are associated with movements of the pistons 47, 48.

Each of the hydraulic cylinders 41, 42 is formed with oil chambers 41a, 41b, 42a, 42b on both sides of the pistons 47, 48, and each of the oil chambers is formed with oil inlet and outlet.

In a normal mode, the pistons 47, 48 are positioned on the rear side of the vehicle within the hydraulic cylinders 41, 42 by a rear wheel steering system, later described, forcing the rear tires 13, 14 to be set in a straight traveling attitude in association with that positioning. In a turn mode, the pistons 47, 48 are positioned on the front side of the vehicle within the hydraulic cylinders 41, 42 by the rear wheel steering system, forcing the rear tires 13, 14 to be set in an internally inclined attitude, as will be later described, in association with that positioning.

FIG. 5 illustrates the rear wheel steering system including a hydraulic circuit and an electrical circuit for the hydraulic cylinders 41, 42. The hydraulic circuit has an oil tank 51, a hydraulic pump 52, a motor 53, and an electromagnetic valve 54. The motor 53 is provided for driving the hydraulic pump 52. Oil within the oil tank 51 is discharged by the hydraulic pump 52 and supplied to the electromagnetic valve 54. The electromagnetic valve 54 has an oil inlet from the pump 52 and an oil outlet to the oil tank 51. The electromagnetic valve 54 also has four ports individually connected to the respective oil chambers 41a, 41b, 42a, 42b of the hydraulic cylinders 41, 42. The electromagnetic valve 54 is operated to switch the hydraulic circuit such that the oil inlet is internally in oil communication with two ports from the oil chambers 41a, 42a, while the oil outlet is in oil communication with two ports from the oil chambers 41b, 42b, when a solenoid 54a of the electromagnetic valve 54 is in a non-excited state, and the oil inlet is internally in oil communication with the two ports from the oil chambers 41b, 42b, while the oil outlet is in oil communication with the two ports from the oil chambers 41a, 42a, when the solenoid 54a of the electromagnetic valve 54 is in an excited state. It should be noted that pipe lines arranged between the oil tank 51, the hydraulic pump 52, the electromagnetic valve 54, and the hydraulic cylinders 41, 42 are simply indicated by solid lines and not designated by reference numerals in FIG. 5.

A rear wheel steering angle controller 60 controls the driving of the motor 53, and switches the solenoid 54a of the electromagnetic valve 54 between the excited and non-excited states. The rear wheel steering angle controller 60 comprises a microcomputer which operates in accordance with an associated program. The rear wheel steering angle controller 60 is connected to a mode switch 61 which is manipulated by the driver to instruct the turn mode, and rim sensors 62, 63 for detecting the positions of the rims 45, 46, respectively. The rim sensor 62 generates a turn position signal when the rim 45 is at a position close to the hydraulic cylinders 41, 42, while the rim sensor 63 generates a straight traveling position signal when the rim 46 is at a position close to the hydraulic cylinders 41, 42. In addition, the rear wheel steering angle controller 60 is connected to a lamp 49 and a buzzer 50, so that the lamp 49 blinks or lights in the turn mode, and the buzzer 50 generates intermittent or continuous alarming sound in the turn mode. Further, the rear wheel steering angle controller 60 is supplied with a P position signal indicating that a shift position of a transmission (not shown) of the vehicle is in a P (parking) position.

The motor 100 is applied with a supply voltage, a normal/reverse rotation signal indicative of a rotating direction, a speed signal for specifying a rotational speed, a brake signal for instructing a braking operation, and a reset signal for disabling a turn. The supply voltage and respective signals are controlled individually by a turn controller 70.

Figure 6:
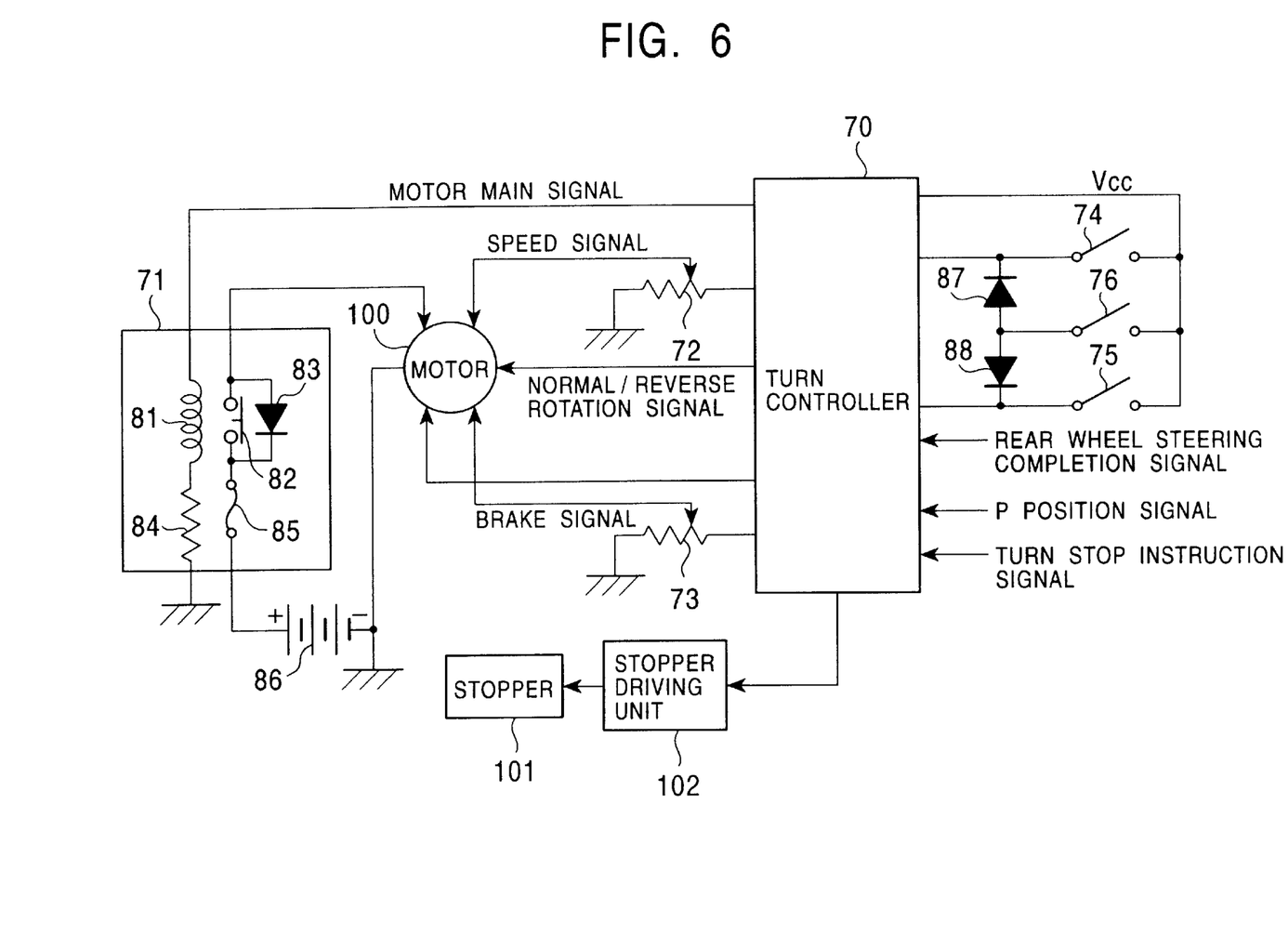
FIG. 6 is a circuit diagram illustrating a driving control system.

FIG. 6 illustrates a driving control system for the motor 100. The driving control system comprises, in addition to the turn controller 70, a relay unit 71, a speed adjusting volume 72, a brake adjusting volume 73, left and right turn switches 74, 75, and a brake switch 76. The turn controller 70 is based on a microcomputer. The left and right turn switches 74, 75 and the brake switch 76 are switches which turn ON only when they are manipulated.

The relay unit 71 comprises a relay coil 81, a relay switch 82, a diode 83, a resistor 84, and a fuse 85. The relay coil 81 and the resistor 84 are connected in series, and arranged such that the relay coil 81 is excited as the relay coil 81 and the resistor 84 are supplied with a motor main signal output from the turn controller 70. The relay switch 82 and the diode 83 are connected in parallel to form a parallel circuit which has one end connected to a positive terminal of a buttery 86, which serves as a power supply, through the fuse 85, and the other end connected to a positive input terminal of a voltage source for the motor 100. The voltage source for the motor 100 has its negative input terminal connected to a negative terminal of the battery 86 for grounding.

The normal/reverse rotation signal, the speed signal, the brake signal and the reset signal are generated from the turn controller 70. The normal/reverse rotation signal and the reset signal are supplied as they are to the motor 100. The speed signal is supplied to the motor 100 through a speed adjusting volume 72, while the brake signal is supplied to the motor 100 through the brake adjusting volume 73. The speed adjusting volume 72 and the brake adjusting volume 73 adjust the level of the speed signal and the level of the brake signal in response to manipulations made thereon, respectively.

Each of the left and right turn switches 74, 75 and the brake switch 76 has one end applied with a voltage Vcc corresponding to a high level, while each of the left and right turn switches 74, 75 has the other end connected to the turn controller 70. The brake switch 76 has the other end connected to the other ends of the left and right turn switches 74, 75, respectively, with diodes 87, 88 interposed therebetween. The diodes 87, 88 are arranged to set the other ends of the respective left and right turn switches 74, 75 to high level when the brake switch 76 is ON.

The turn controller 70 is supplied with a steering completion signal indicative of the completion of turn steering angle control from the rear wheel steering angle controller 60 as well as supplied with the P position signal.

Figure 7:
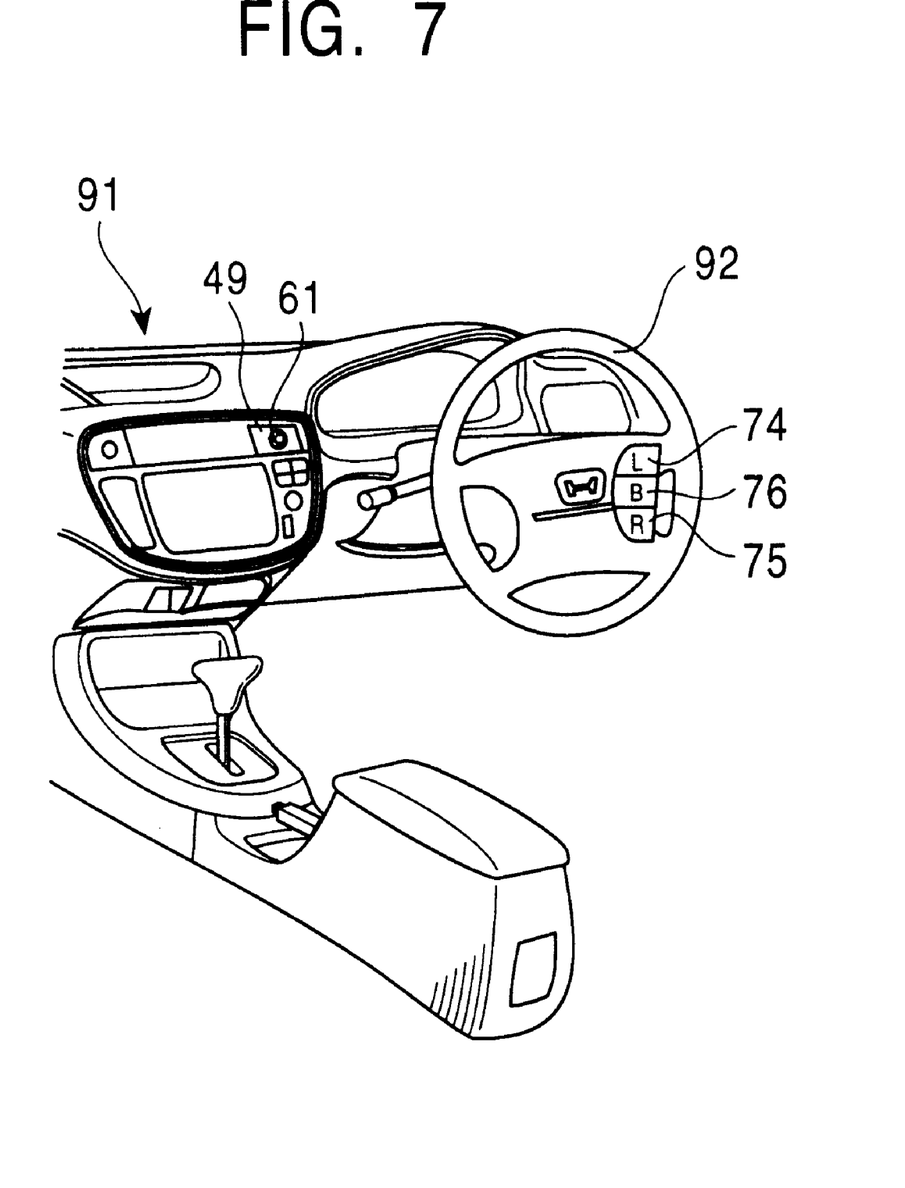
FIG. 7 is a diagram illustrating where switches and lamps shown in FIGS. 5 and 6 are disposed within the vehicle.

FIG. 7 illustrates positions at which the mode switch 61, the turn switches 74, 75, and the brake switch 76 are disposed within the vehicle. The mode switch 61 is located in a central portion of a front panel 91, while the turn switches 74, 75 and the brake switch 76 are arranged integral with a steering wheel 92. Also, around the mode switch 61, a lighting or blinking display is provided by the lamp 49.

Next, the operation of the foregoing turning mechanism will be described in accordance with associated programs processed by the rear wheel steering controller 60 and the turn controller 70. The rear wheel steering angle controller 60 executes a rear wheel steering routine, while the turn controller 70 executes a turn control routine.

Figure 8:
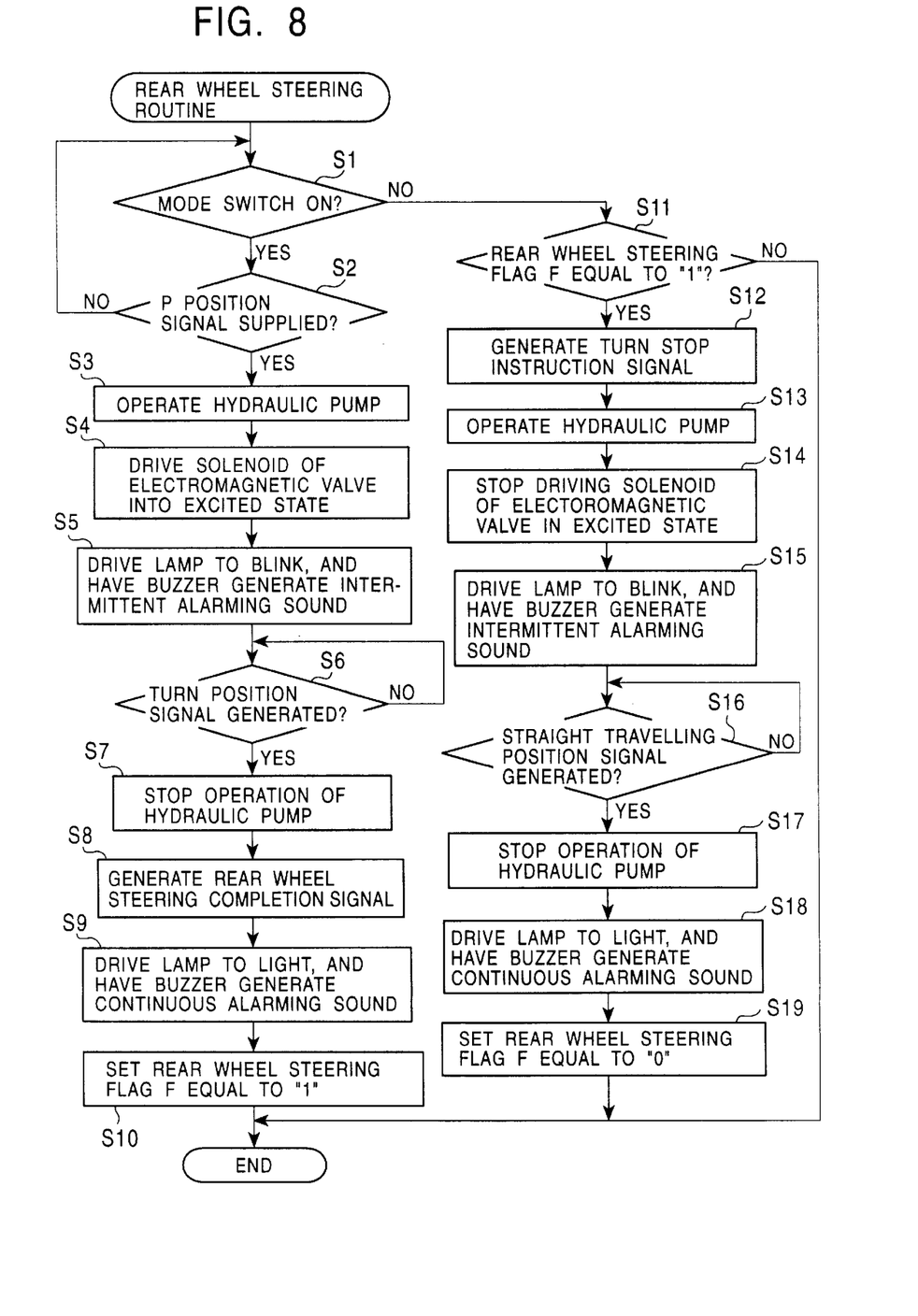
FIG. 8 is a flow chart illustrating a rear wheel steering routine.

First, in the rear wheel steering routine as illustrated in FIG. 8, the rear wheel steering angle controller 60 determines whether or not the mode switch 61 is ON (step S1). As the mode switch 61 turns ON, the rear wheel steering angle controller 60 determines whether or not the P position signal has been supplied thereto (step S2). The step S2 is provided for determining whether or not the vehicle is stopped. As the shift position of the transmission is in the P position when the P position signal has been supplied, this means that the turn steering angle control can be initiated.

After executing step S2, the rear wheel steering angle controller 60 drives the motor 53 to operate the hydraulic pump 52 (step S3), and drives the solenoid 54a of the electromagnetic valve 54 into an excited state (step S4). In addition, the rear wheel steering angle controller 60 drives the lamp 49 to blink, and has the buzzer 50 generate intermittent alarming sound (step S5). The execution of steps S3 and S4 causes the hydraulic pump 52 to discharge oil within the oil tank 51, which is supplied to the oil chambers 41b, 42b in the respective hydraulic cylinders 41, 42 through the electromagnetic valve 54. On the other hand, the oil chambers 41a, 42a in the respective oil cylinders 41, 42 communicate with the oil tank 51 through the electromagnetic valve 54, so that the oil within the oil chambers 41a, 42a returns to the oil tank 51 through the electromagnetic valve 54. Thus, the oil discharged from the oil tank 51 by the hydraulic pump 52 is supplied to the oil chambers 41b, 42b and acts to increase the volumes of the oil chambers 41b, 42b and therefore presses the pistons 47, 48 toward the oil chambers 41a, 42a. As the pistons 47, 48 are moved toward the oil chambers 41a, 42a, the rods 43, 44 and the rims 45, 46 are moved toward the front of the vehicle, associated with the movements of the pistons 47, 48.

As the rim 45 is moved toward the front of the vehicle, the left and right knuckle arms 24b, 36b are pulled toward the front of the vehicle through the left and right connecting arms 32, 40, causing pivotal movements of the left and right rear wheels 15, 16 on supporting shafts (indicated by reference letters A in FIG. 1) of the knuckles 24, 36 in a direction indicated by arrows shown in FIG. 1. More specifically, the movement of the rim 45 causes pivotal movements of a feature associated with the rear wheels including the rear tires 13, 14 and the knuckles 24, 36 as well as those of the rear wheels 15, 16.

During the pivotal movements of the left and right rear wheels 15, 16, the lamp 49 is driven to blink, while the buzzer 50 generates intermittent alarming sound.

Figure 9:
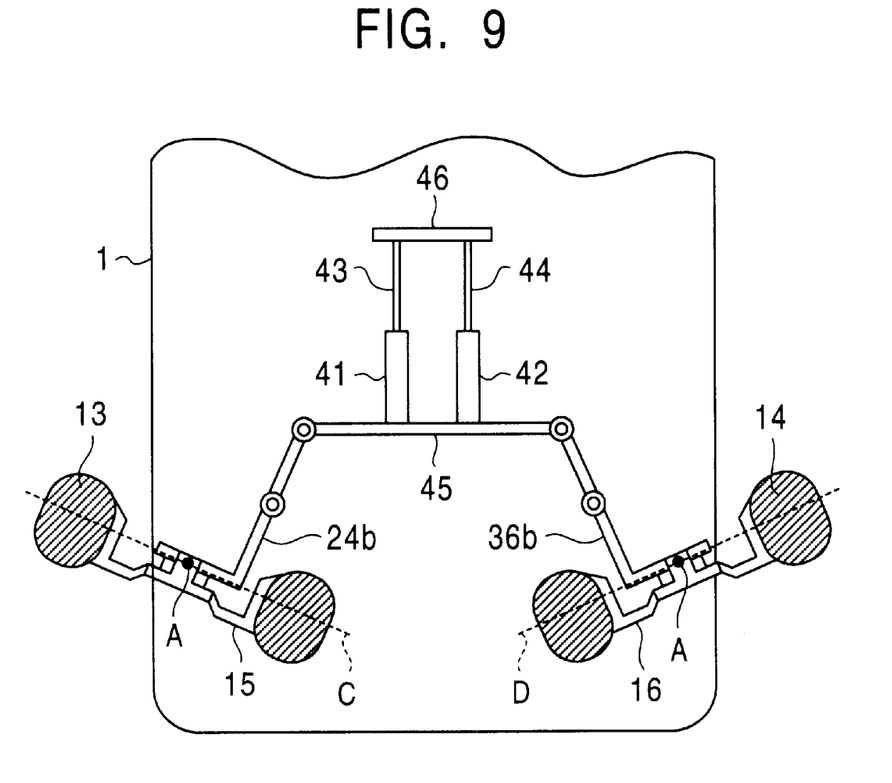
FIG. 9 is a diagram illustrating the state of rear wheels in a turn mode.

After executing step S5, the rear wheel steering angle controller 60 determines whether or not the turn position signal has been generated (step S6). As the rim 45 moves to a position close to the hydraulic cylinders 41, 42, the rim sensor 62 generates the turn position signal. When the turn position signal is generated, the left and right rear wheels 15, 16 are generally in internally inclined attitude as illustrated in FIG. 9. In the illustrated state, the left and right rear wheels 15, 16 are defined at predetermined angular positions along tangential directions of an arc passing the points indicated by reference letters A in FIG. 1, with the center of the arc (indicated by reference letter B in FIG. 1) being located in a central portion of the rotating axle of the front wheels 4, 5. Broken lines C, D in FIG. 9 indicate the tangential positions. The point indicated by reference letter A is at the position of the screw 30a of the trailing arm 30 on the left side of the vehicle, which is the point at which the knuckle 24 intersects the center axis of rotation of the left rear wheel 15. Likewise, on the right side of the vehicle, the point indicated by reference letter A is at the position at which the knuckle 36 intersects the central axis of rotation of the right rear wheel 16.

As the turn position signal is generated, the rear wheel steering angle controller 60 stops driving the motor 53 to stop the operation of the hydraulic pump 52 (step S7), and generates a real wheel steering completion signal to the turn controller 70 (step S8). Also, the rear wheel steering angle controller 60 drives the lamp 49 to light, has the buzzer 50 generate continuous sound (step S9), and sets a rear wheel steering flag F equal to "1" (step S10). The rear wheel steering flag F is initially set to "0."

Upon determining at step S1 that the mode switch 61 is OFF, the rear wheel steering angle controller 60 determines whether or not the rear wheel steering flag F is "1" (step S11). If the rear wheel steering flag F is equal to "0," the operation of this routine is terminated. On the other hand, if the rear wheel steering flag F is equal to "1," this means that the mode switch 61 has been turned OFF to recover the original straight traveling steering angle for the left and right rear wheels 15, 16, which have been controlled to be in the internally inclined attitude to have a steering angle suitable for turning, so that the rear wheel steering angle controller 60 generates a turn stop instruction signal to the turn controller 70 (step S12), drives the motor 53 to operate the hydraulic pump 52 (step S13), and stops driving the solenoid 54a of the electromagnetic valve 54 in the excited state (step S14). In addition, the rear wheel steering angle controller 60 drives the lamp 49 to blink, and has the buzzer 50 generate intermittent sound (step S15). The execution of steps S13 and S14 causes the hydraulic pump 52 to discharge oil within the oil tank 51, and the internal paths of the electromagnetic valve 54 to be switched, so that the discharged oil is supplied to the oil chambers 41a, 42a of the respective hydraulic cylinders 41, 42 through the electromagnetic valve 54. On the other hand, the oil chambers 41b, 42b of the hydraulic cylinders 41, 42 communicate with the oil tank 51 through the electromagnetic valve 54 to return the oil within the oil chambers 41b, 42b to the oil tank 51 through the electromagnetic valve 54. Thus, the discharged oil from the oil tank 51 by the hydraulic pump 52 is supplied to the oil chambers 41a, 42a, thereby acting to increase the volumes of the oil chambers 41a, 42a to press the pistons 47, 48 toward the oil chambers 41b, 42b. The movements of the pistons 47, 48 toward the oil chambers 41b, 42b causes associated movements of the rods 43, 44 and the rims 45, 46 to the rear of the vehicle.

As the rim 45 moves toward the rear of the vehicle, the left and right knuckle arms 24b, 36b are pressed to the rear of the vehicle through the left and right connecting arms 32, 40, respectively, thus causing pivotal movements of the left and right rear wheels 15, 16 on the supporting shafts of the knuckles 24, 36 such that the wheels 15, 16 are oriented in the straight traveling direction of the vehicle. More specifically, the movement of the rim 45 causes pivotal movements of the feature associated with the rear wheels including the rear tires 13, 14 and the knuckles 24, 36 as well as those of the rear wheels 15, 16.

During the pivotal movements of the left and right rear wheels 15, 16, the lamp 49 is driven to blink, while the buzzer 50 generates intermittent alarming sound.

After executing step S15, the rear wheel steering angle controller 60 determines whether or not the straight traveling position signal has been generated (step S16). As the rim 46 moves to a position close to the hydraulic cylinders 41, 42, the rim sensor 63 generates the straight traveling position signal. When the straight traveling position signal is generated, the left and right rear wheels 15, 16 are generally returned to the original straight traveling attitude as illustrated in FIG. 1.

As the straight traveling position signal is generated, the rear wheel steering angle controller 60 stops driving the hydraulic pump 52 (step S17), stops driving the lamp 49 and the buzzer 50 (step S18), and set the rear wheel steering flag F equal to "0" (step S19).

Figure 10:
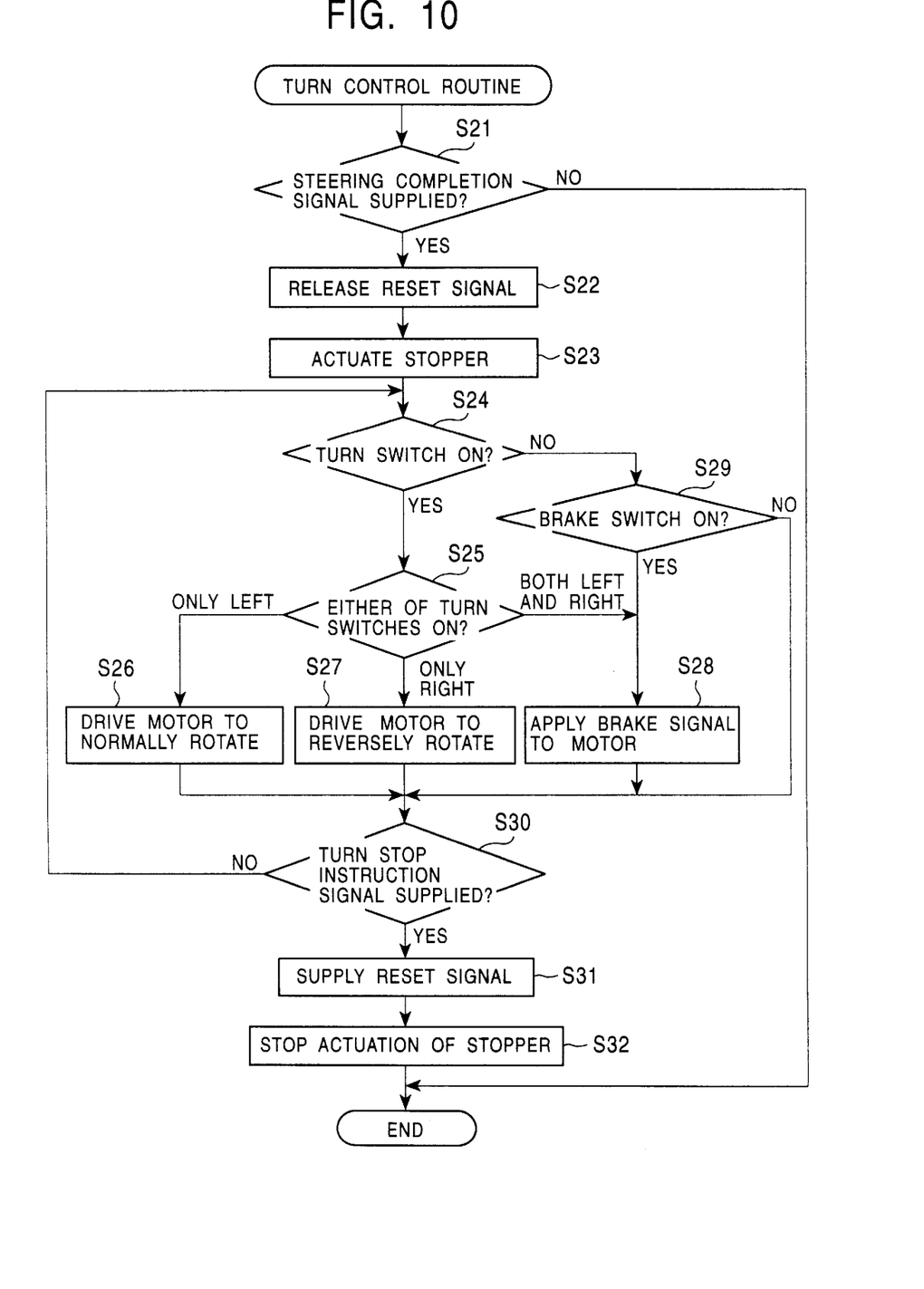
FIG. 10 is a flow chart illustrating a turn control routine.

Next, in the turn control routine as illustrated in FIG. 10, the turn controller 70 determines whether or not the steering completion signal has been generated (step S21). As the rear wheel steering angle controller 60 has generated the steering completion signal at the aforementioned step S8, the steering completion signal is supplied to the turn controller 70.

Upon receipt of the steering completion signal, the turn controller 70 releases the reset signal (step S22), and actuates the stopper 101 through the stopper driving unit 102 (step S23). Since the motor 100 is normally supplied with the reset signal from the turn controller 70 and therefore disabled to rotate, the reset signal supplied to the motor 100 is stopped to bring the motor 100 into a motor operation waiting state. Also, the stopper 101, when actuated, engages with the ring gear 96 to be fixed together with the case 95a so as to prevent the ring gear 96 from rotating.

After executing the step S23, the turn controller 70 determines whether or not the turn switches are ON (step S24). When at least one of the left and right turn switches 74, 75 is ON, the turn controller 70 determines which of the turn switches 74, 75 is ON (step S25). The turn controller 70 drives the motor 100 to normally rotate when the left turn switch 74 alone is ON (step S26); drives the motor 100 to reversely rotate when the right turn switch 75 alone is ON (step 27); and supplies the motor 100 with a brake signal when both the left and right turn switches 74, 75 are ON (step S28). When both the left and right turn switches 74, 75 are OFF, the turn controller 70 determines whether or not the brake switch 76 is ON (step S29). When the brake switch 76 is ON, the turn control routine proceeds to step S28 where a brake signal is supplied to the motor 100. The brake signal supplied to the motor 100 results in braking the rotation of the motor 100.

Figure 11:
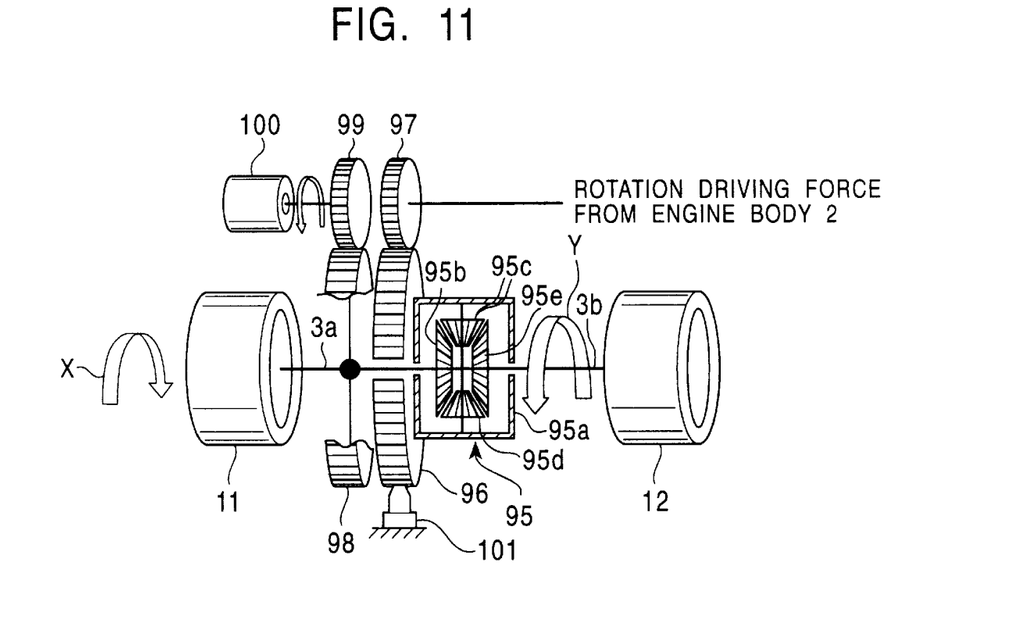
FIG. 11 is a diagram generally illustrating the state of the front wheel driving mechanism during a turning operation.

When the operations at steps S24 to S29 indicate that the left turn switch 74 is manipulated to turn ON, the turn controller 70 supplies the motor 100 with a normal/reverse rotation signal for specifying normal rotation, causing the motor 100 to normally rotate in response to the normal/reverse rotation signal. Since the normal rotation of the motor 100 is transmitted to the driving axle 3a through the driving gear 99 and the gear 98, the driving axle 3a is rotated to rotate the left front wheel 4 as indicated by an arrow X in FIG. 11. In addition, the rotation of the driving axle 3a causes one side gear 95b within the differential 95 to rotate. The rotation of the side gear 95b is transmitted to the other side gear 95e after converted to reverse rotation by two pinions 95c, 95d. In this way, the other side gear 95e reversely rotates the right wheel 5 through the driving axle 3b as indicated by an arrow Y in FIG. 11 in the direction opposite to the rotating direction of the left wheel 4. Thus, the left front wheel 4 is rotated in the direction in which the vehicle goes forward, while the right front wheel 5 is rotated in the direction in which the vehicle goes backward, so that the vehicle body 1 turns to left on the center which is located at the center of the rotating axle of the front wheels 4, 5 (indicated by reference letter B in FIG. 1), causing the rotatable rear wheels 15, 16 to rotate pursuant to the vehicle body turning counterclockwise.

On the other hand, when the right turn switch 75 is manipulated to turn ON, the turn controller 70 supplies the motor 100 with a normal/reverse rotation signal for specifying reverse rotation, causing the motor 100 to reversely rotate in response to the normal/reverse rotation signal. Since the reverse rotation of the motor 100 is transmitted to the driving axle 3a through the driving gear 99 and the gear 98, the driving axle 3a is rotated to rotate the left front wheel 4 in the direction reverse to that indicated by the arrow X in FIG. 11. In addition, the rotation of the driving axle 3a causes one side gear 95b within the differential 95 to rotate. The rotation of the side gear 95b is transmitted to the other side gear 95e after converted to reverse rotation by the two pinions 95c, 95d. In this way, the other side gear 95e rotates the right wheel 5 through the driving axle 3b in the direction reverse to that indicated by the arrow Y in FIG. 11. Thus, the left front wheel 4 is rotated in the direction in which the vehicle goes backward, while the right front wheel 5 is rotated in the direction in which the vehicle goes forward, so that the vehicle body 1 turns clockwise on the center which is located at the center of the rotating axle of the front wheels 4, 5 (indicated by reference letter B in FIG. 1), causing the rotatable rear wheels 15, 16 to rotate pursuant to the vehicle body turning clockwise.

As the brake switch 76 is manipulated to turn ON, the turn controller 70 supplies the motor 100 with a brake signal, to brake the rotation of the motor 100. Likewise, when the left turn switch 74 and the right turn switch 75 are both manipulated to turn ON, the motor 100 is supplied with a brake signal to brake the motor 100.

Upon driving the motor 100 to normally or reversely rotate, as described above, the turn controller 70 supplies a motor main signal to the relay unit 71. In the relay unit 71, the relay coil 81 is excited in response to the motor main signal to turn the relay switch 83 ON. The relay switch 83 thus turned ON lets a current flow from the positive terminal of the battery 86, through the fuse 85, the relay switch 83, the motor 100, into the negative terminal of the battery 86. In this way, the motor 100 is applied with an output voltage of the battery 86 to produce normal rotation or reverse rotation thereof.

After executing step S26, S27 or 28, the turn controller 70 determines whether or not the turn stop instruction signal has been supplied thereto (step S30). Step S30 is also executed when the brake switch 76 is determined to be OFF at step S29. As the mode switch 61 is manipulated to turn OFF to cause the rear wheel steering angle controller 60 to generate the turn stop instruction signal at the aforementioned step S12, the turn stop instruction signal is supplied to the turn controller 70. If no turn stop instruction signal is supplied, the turn controller 70 returns to step S24 to repeat the foregoing operations. On the other hand, the turn stop instruction signal, if supplied, terminates the turning operation of the vehicle, so that the turn controller 70 supplies the reset signal to the motor 100 (step S31), and stops the actuation of the stopper 101 by means of the stopper driving unit 102 (step S32), followed by the termination of this routine. The reset signal supplied to the motor 100 results in locking the motors 100 which is thus set into a rotation disabled state. In addition, as the stopper 101 is stopped operating, the ring gear 96 is released from the engagement with the stopper 101, so that the ring gear 96 is made rotatable with the case 95a by the rotation of the driving gear 97.

For making a turn, the driver first manipulates the transmission into the P position to allow the turn mode, and subsequently manipulates the mode switch 61 to turn ON. As a result, the vehicle is set into the turn mode, causing the left and right rear wheels 15, 16 so far oriented in the vehicle straight traveling direction to start pivotal movements on their respective vertical axes. During the pivotal movements, the lamp 49 blinks, and the buzzer 50 generates intermittent alarming sound. When the left and right rear wheels 15, 16 are brought into the internally inclined attitude as previously illustrated in FIG. 10, the lamp 49 is continuously lit, and the buzzer 50 generates continuous alarming sound. The driver recognizes through the lit lamp 49 or the continuous alarming sound of the buzzer 50 that a turning operation is enabled.

Then, as the driver manipulates the left turn switch 74 to turn ON, the motor 100 is normally rotated to rotate the front wheels 4, 5 in directions opposite to each other. Since the left front wheel 4 is rotated in the direction in which the vehicle goes forward, while the right front wheel 5 is rotated in the direction in which the vehicle goes backward, the rear wheels 15, 16 are also rotated following the front wheels 4, 5, resulting in turning the vehicle counterclockwise. On the other hand, as the driver manipulates the right turn switch 75 to turn ON, the motor 100 is reversely rotated to rotate the wheels 15, 16 in directions opposite to each other. Since the left front wheel 4 is rotated in the direction in which the vehicle goes backward, while the right front wheel 5 is rotated in the direction in which the vehicle goes forward, the rear wheels 15, 16 are also rotated following the front wheels 4, 5, resulting in turning the vehicle clockwise. For stopping the turning operation, the driver manipulates the brake switch 76 or both the left and right turn switches 74, 75 to turn ON. In this way, the motor 100 is braked to stop the rotations of the motor 100, i.e., the rotations of the rear wheels 15, 16.

After the driver has made a desired turn, the driver manipulates the mode switch 61 to turn OFF. The mode switch 61, when turned OFF, causes the lamp 49 to blink, and the buzzer 50 to generate intermittent alarming sound. Then, the left and right rear wheels 15, 16 now in the internally inclined attitude start pivotal movements on the vertical axes so as to orient in the vehicle straight traveling direction. As the left and right rear wheels 15, 16 are returned to the original vehicle straight traveling direction, the lamp 49 stops blinking, and the buzzer 50 stops generating the intermittent alarming sound. The driver recognizes through the unlit lamp 49 or the stopped intermittent alarming sound from the buzzer 50 that the turn mode has been terminated to set the vehicle again into the normal mode.

In the foregoing embodiment, the feature for engaging the knuckle 24 with the trailing arm 30 constitutes a rotation supporting device which supports one of the left and right wheels rotatable on an axis perpendicular to the ground, while the feature composed of the hydraulic cylinders 41, 42, the rods 43, 44, the rims 45, 46, and the connecting arms 32, 40 constitutes a rotating position fixing device. Also, the motor 100 corresponds to a turn driving device for applying a rotating torque to one pair of left and right wheels to turn the vehicle.

Since the foregoing embodiment has been described for a vehicle equipped with an automatic transmission, step S2 determines whether or not the shift position of the transmission lies in the P position. For a vehicle equipped with a manual transmission, step S2 may determine whether or not the shift position lies in a neutral position or whether or not a side brake has been actuated. Alternatively, step S2 may determine whether the shift position lies in the P position or the neutral position and whether or not the side brake is being operated.

Further, since the foregoing embodiment has been described for a front wheel drive vehicle, the rear wheels are pivoted into the internally inclined attitude in the turn mode. For a rear wheel drive vehicle, on the other hand, front wheels are pivoted into a similar internally inclined attitude. In the latter case, the front wheels are fixed at predetermined angular positions along tangential directions of an arc having the center located at the center of the rotating axle between the rear wheels.

Further, in the foregoing embodiment, the left and right wheels are simultaneously pushed by way of a pair of cylinders. Alternatively, the left and right wheels may be individually driven, or may be applied with a driving force in a lateral direction of the vehicle. For example, the left and right knuckle arms 24b, 36b may be directly pushed without intervention of the rim 45 and the arms 32, 40, respectively. Further alternatively, the driving force may be applied in a variety of ways such as by use of a differential rack.

Figure 12:
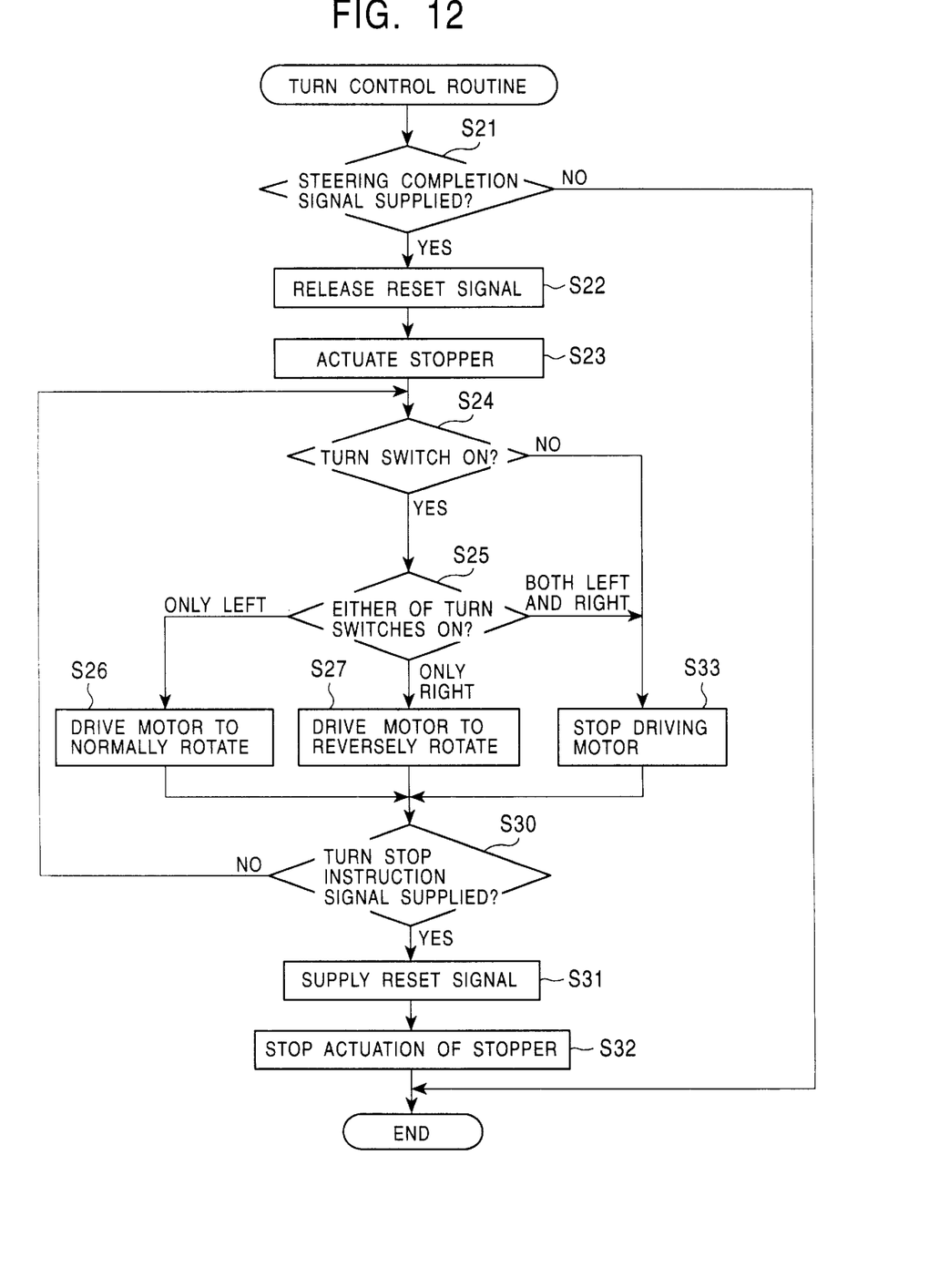
FIG. 12 is a flow chart illustrating another example of the turn control routine.

While the aforementioned turn control routine has been described in connection with a vehicle equipped with the manual brake switch 76, the brake switch 76 may be omitted. In this configuration, as illustrated in FIG. 12, the turn controller 70 proceeds to step S33 to stop supplying the motor 100 with a current by stopping driving the motor 100 when the left and right turn switches 74, 75 are determined to be both OFF at step S24 or when the left and right turn switches 74, 75 are both ON at step S25. In other words, the driving of the motor 100 is stopped to stop the vehicle by running resistance. Further, in this event, the vehicle is braked during a turning operation in response to the driver stepping on the brake pedal in order to stop the vehicle at a desired position. As the driver steps on the brake pedal, the brake disk 33 is brought into contact with the brake caliper 35 in the left rear wheel, while a brake disk is brought into contact with a brake caliper, both not shown, also in the right rear wheel, resulting in braking the rotation of the rear wheels 15, 16. This operation may be performed by another control system separate from the turn controller 70.

Also, the brake switch 76 may be turned ON associated with the driver stepping on the brake pedal, in which case, the brake switch 76 turns ON in response to the driver stepping on the brake pedal, causing the turn control routine to proceed to step S28, where the rotation of the motor 100 is braked, as illustrated in FIG. 10.

Furthermore, the motor 100 may be applied with a slight current when the driver is stepping on the brake pedal in order to stop turning the vehicle. This application of a slight current is performed for implementing subtle braking by means of the brake pedal by applying a torque such as a creep torque of an automatic transmission during the turn stopping control.

Again, in the turn control routine in FIG. 10 the stopper 101 is actuated at step S23 after the reset signal is released at step S22. Alternatively, the stopper 101 may be actuated, for example, when the shift lever of the automatic transmission is shifted into the P position, or the stopper 101 may be actuated in association with the side brake. In essence, the stopper 101 may be actuated when the stopped vehicle is detected.

As described above, according to the four-wheel vehicle of the present invention, one of front and rear pairs of left and right wheels, to which a running torque by a driving source is not transmitted, are arranged for rotation concerning their respective axes perpendicular to the ground, and the one pair of left and right wheels are fixed during a vehicle turning operation at angular positions along tangential directions of an arc passing the axes of the one pair of the left and right wheels perpendicular to the ground and having the center near the center point of the rotating axle of the other pair of left and right wheels, so that it is possible to provide a relatively simple and small turning mechanism. Also, since the radius of the arc passing the axes of the one pair of left and right wheels perpendicular to the ground and having the center near the center point of the rotating axle of the other pair of left and right wheels is the turning radius when the vehicle is turned, the turning radius is extremely small. Further, since the other pair of left and right wheels are applied with rotating torques in directions different from each other at fixed angular positions of the one pair of left and right wheels, it is possible to readily turn the vehicle body. Thus, the four-wheel vehicle according to the foregoing embodiment, because of its ability of making a small shape turn, facilitates the driving which involves a turning operation of the vehicle such as column parking, entry into a garage, U-turn, and so on.

What is claimed is:

1. A four-wheel vehicle equipped with a turning mechanism comprising:

a rotatable supporting device for supporting one of front and rear pairs of left and right wheels, to which a running torque produced by a driving force is not transmitted, for rotation about respective axes perpendicular to the ground;

a rotating position fixing device for positioning said one pair of left and right wheels to which the running torque is not transmitted at respective angular positions along tangential directions of an arc passing said respective axes perpendicular to the ground of said one pair of left and right wheels, said arc having the center located at or near a center point of a rotating axle for driving said vehicle, said rotating axle corresponding to the other of the front and rear pairs of left and right wheels, said rotating position fixing device being arranged for rotating said one pair of left and right wheels in opposite directions about said axes perpendicular to the ground; and a turn driving device for applying two rotating torques, each in opposite directions, to said other pair of left and right wheels when said rotation position fixing device positions said one pair of left and right wheels at said angular positions to turn a vehicle body at or adjacent to the center point of the rotating axle for driving said vehicle.

2. A four-wheel vehicle equipped with a turning mechanism according to claim 1, further comprising a driving device for turning said one pair of left and right wheels on the axes perpendicular to the ground between a straight traveling position and said angular positions along the tangential directions.

3. A four-wheel vehicle equipped with a turning mechanism according to claim 1, wherein said rotatable supporting device includes trailing arms for rotatably supporting said one pair of left and right wheels through knuckles at said axes perpendicular to the ground of said one pair of left and right wheels.

4. A four-wheel vehicle equipped with a turning mechanism comprising:

a rotatable supporting device for supporting one of front and rear pairs of left and right wheels, to which a running torque produced by a driving force is not transmitted, for rotation about respective axes perpendicular to the ground;

a rotating position fixing device for positioning said one pair of left and right wheels to which the running torque is not transmitted at respective angular positions along tangential directions of an arc passing said respective axes perpendicular to the ground of said one pair of left and right wheels, said arc having the center located at or near a center point of a rotating axle for driving said vehicle, said rotating axle corresponding to the other of the front and rear pairs of left and right wheels; and a turn driving device for applying two rotating torques, each in opposite directions, to said other pair of left and right wheels when said rotating position fixing device positions said one pair of left and right wheels at said angular positions to turn a vehicle body at or adjacent to the center point of the rotating axle for driving said vehicle, wherein said turn driving device applies said rotating torques in different directions from each other to said other pair of left and right wheels with a driving source different from said driving source to turn said vehicle body.

5. A four-wheel vehicle equipped with a turning mechanism comprising:

a rotatable supporting device for supporting one of front and rear pairs of left and right wheels, to which a running torque produced by a driving force is not transmitted, for rotation concerning respective axes perpendicular to the ground;

a rotating position fixing device for positioning said one pair of left and right wheels to which the running torque is not transmitted at respective angular positions along tangential directions of an arc passing said respective axes perpendicular to the ground of said one pair of left and right wheels, said arc having the center located at or near a center point of a rotating axle for driving said vehicle, said rotating axle corresponding to the other of the front and rear pairs of left and right wheels; and a turn driving device for applying two rotating torques, each in opposite directions, to said other pair of left and right wheels when said rotating position fixing device positions said one pair of left and right wheels at said angular positions to turn a vehicle body at or adjacent to the center point of the rotating axle for driving said vehicle, wherein said turn driving device includes:

a device for fixing a case for rotatably supporting two pinions arranged in a differential during a turning operation of said vehicle body; and a motor for driving one of side gears arranged in said differential to rotate.

* * * * *